United States Patent [19]

Dijksterhuis

[11] 4,098,167

[45] Jul. 4, 1978

[54] ANCHOR BOLT

[75] Inventor: Jan J. Dijksterhuis, Roden, Netherlands

[73] Assignee: Industrie-en Handelsonderneming Elton B.V., Roden, Netherlands

[21] Appl. No.: 668,307

[22] Filed: Mar. 18, 1976

[30] Foreign Application Priority Data

Mar. 20, 1975 [NL] Netherlands .......................... 7503339

[51] Int. Cl.$^2$ .......................................... F16B 13/04
[52] U.S. Cl. ...................................................... 85/79
[58] Field of Search ................................ 85/67, 69, 79

[56] References Cited

U.S. PATENT DOCUMENTS

| 1,864,300 | 6/1932 | Forrest ...................................... 85/79 |
| 2,203,178 | 6/1940 | Pierce ........................................ 85/70 |
| 2,231,068 | 2/1941 | Harrington ........................... 85/79 X |
| 2,774,273 | 12/1956 | Olson ......................................... 85/79 |
| 2,934,990 | 5/1960 | Johnson ................................... 85/79 |
| 3,021,745 | 2/1962 | Libom ....................................... 85/79 |
| 3,117,483 | 1/1964 | Brown ...................................... 85/79 |
| 3,427,919 | 2/1969 | Lerich .................................. 85/79 X |
| 3,744,367 | 7/1973 | Lerich ....................................... 85/79 |
| 3,750,526 | 8/1973 | Lerich ....................................... 85/79 |
| 3,802,311 | 4/1974 | Ziegler ...................................... 85/79 |
| 3,816,902 | 6/1974 | Beer ................................... 151/14 R X |

FOREIGN PATENT DOCUMENTS

| 529,300 | 11/1972 | Switzerland. |
| 546,984 | 8/1942 | United Kingdom ...................... 85/79 |
| 1,321,479 | 6/1973 | United Kingdom ...................... 85/79 |
| 1,190,731 | 5/1970 | United Kingdom ...................... 85/79 |
| 1,142,858 | 2/1969 | United Kingdom ...................... 85/79 |
| 175,127 | 2/1922 | United Kingdom ...................... 85/79 |

*Primary Examiner*—Roy D. Frazier
*Assistant Examiner*—Thomas J. Holko
*Attorney, Agent, or Firm*—Fleit & Jacobson

[57] ABSTRACT

The invention relates to an anchor bolt having a shank, a screw-threaded portion at one end of the shank, an essentially flat bevelled portion in the shank, the depth of the bevelled portion perpendicular to the bolt axis being decreasing in the direction of the shank end opposite to the screw-threaded end. A shiftable member is mounted on the bevelled portion and is movable away from the bolt with respect to the bolt axis during relative displacement of the shiftable member and the bolt. The shiftable member cooperating with the bevelled portion is a flat plate, and the cross-sectional area of said bolt at the position of the maximum depth of said bevelled portion is greater than the cross-sectional area of the core of the screw-thread. The flat plate is polygonal in cross-section and at least one corner of the flat plate projects from the cylindrical circumference of said bolt shank.

5 Claims, 9 Drawing Figures

ANCHOR BOLT

The invention relates to an anchor bolt having a shank at one end being provided with screw-thread. Between the ends of the bolt is an essentially flat bevelled portion, the depth of which perpendicular to the bolt axis decreases in the direction of the other end, which bevelled portion cooperates with a shiftable member thereon moving away from the bolt with respect to the bolt axis during relative displacement.

Such anchor bolts are known in many modifications.

With such anchor bolts the bevelled portion is a turned in either a wedgeshaped portion or a conical portion, and the member cooperating with said portion comprises a number of segments or an expandable sleeve, provided on the conical portion of said anchor bolt. Some of these known anchor bolts have the disadvantage, that a hole has to be bored for receiving the anchor bolt, said hole being larger than the diameter of the anchor bolt. For instance, a hole of 16 mm diameter is necessary for a bolt of 10 mm. Thus, such bolts have a poor contact with the hole wall since they are only supported by the expanded portions. The pulling out value of said bolts then is also rather low and much lower than the tensile strength of the bolt.

Other known anchor bolts are provided with a conical portion at an end, around which lies an expandable portion, for instance a split bush, being hardly larger than the bolt diameter. These bolts have a pulling out value lower than the tensile strength of the bolt. Thus, there exists the possibility of pulling the bolt out of the wall. If this should fail the bolt breaks at the location of the constriction where the conical portion begins, since the bolt is substantially weakened at that location.

Another disadvantage of such known bolts is that they are rather expensive in manufacturing because after the conical portion is turned and the sleeve or the segments are manufactured the whole must be assembled.

The object of the invention is to provide a more simple and stronger construction with a pulling out value which is higher than known bolts.

This object is achieved by housing the member cooperating with the bevelled portion to be a plate, the shape and dimension being such that at the position of the maximum depth of said bevelled portion, the surface of the remaining cross section of the bolt is larger than that of the core of the screw-thread. The anchor bolt can be positioned with its shank entirely against the wall of the hole.

With an embodiment according to the invention the plate is polygonal and at least one corner of said plate projects from the cylindrical circumference of the bolt shank. If the anchor bolt is applied in concrete, stone, metal, wood or other material the advantage is obtained that during stroking into the hole the projecting edges form grooves in the above-mentioned material, which hold the plate, so that turning of the bolt is prevented.

In another embodiment according to the invention, notches are provided in the cylindrical circumference at the end of the bolt shank opposite the end having a screw-thread. The notches are situated in planes perpendicular to the bolt axis.

The plate can be delivered separate or attached on the anchor bolt by means of adhesive tape to prevent its being lost. In a preferred embodiment of the invention plate and bolt are magnetically coupled to each other.

The cited embodiments have the advantage of being simple in manufacturing and apparently having a higher pulling out value than the known anchor bolts. As the anchor bolt of the invention is more simple, the anchor bolt can be manufactured at a higher production, for instance 10,000 a day in comparison to 2,000 of the known anchor bolts. By these means the price may be maintained low. The plate may be punched and the flat bevelled portion pressed or milled.

The invention will be further elucidated by means of the attached drawing, showing an embodiment of the invention.

Figure 1:
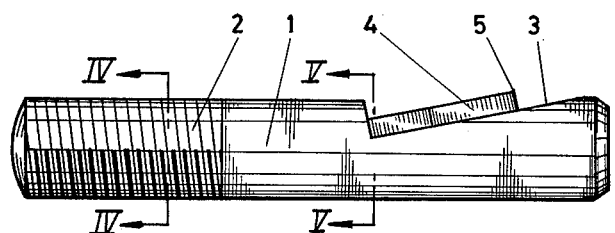
FIG. 1 is a side-view of an anchor bolt according to the invention.
Figure 3:
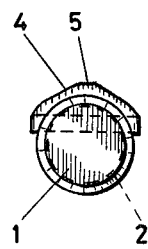
FIG. 3 is a front view of the anchor bolt.
Figure 2:
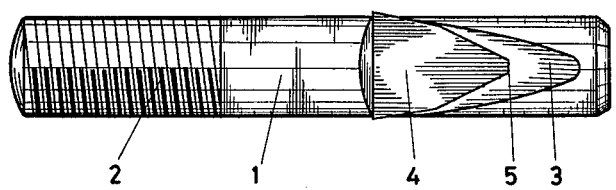
FIG. 2 is a plan view of the anchor bolt.

The anchor bolt, shown in FIGS. 1-3, comprises a shank 1 at one end being provided with screw-thread 2 and between its end a flat bevelled portion 3. The depth of the bevelled portion perpendicular to the bolt axis increases in the direction of the screw thread. The flat bevelled portion and the axis of the bolt shank may for instance be at an angle of 10°.

On said bevelled portion 3 a cooperating member 4 is positioned having the shape of a flat and pointed plate, the shape of which is most clearly shown in FIG. 2. The plate is shown in FIG. 1 in withdrawn position, the point 5 of said plate projecting out of the cylindrical surface of the bolt.

Figure 4:
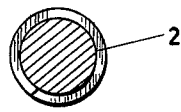
FIG. 4 is a sectional view along the plane IV — IV of FIG. 1.
Figure 5:
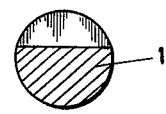
FIG. 5 is a sectional view along the plane V — V of FIG. 1.
Figure 7:
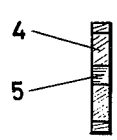
FIG. 7 is a front view of the cooperating member.

For preventing the bolt from being weakened too much at the location of the greatest depth of the bevelled portion, it is provided that the surface of the remaining cross section of the bolt at the maximum constriction is larger than that of the core of the screw-thread, so that the bolt might break at the screw-thread and not near the maximum depth of said bevelled portion. The plate preferably consists of stainless steel. FIGS. 4 and 5 show the cross-sectional areas at the screw-thread and the location of greatest depth respectively. The cross-sectional area of 1 in FIG. 5 is greater than the cross-sectional area of 2 in FIG. 4. It is also contemplated to use other materials, for instance synthetic material, both for the bolt and for the plate.

The application of the bolt can be as follows:

In the material in which the bolt has to be fixed a hole is bored having substantially the same diameter as the diameter of the anchor bolt. Thereafter the anchor bolt is struck in said hole, so that the point 5 of the plate forms a groove in the material of the wall of said hole. After the bolt has been struck sufficiently deep a nut is screwed on the anchor bolt until said nut touches the material in which the bolt is placed. By screwing the nut further the plate 4 is shifted along the wedgeshaped bevelled portion so that the bolt is secured in the material by means of the plate. The groove in the material formed by the point 5 prevents the bolt from turning during turning of the nut. The effect may be increased because not only the pointed angle of the plate in the withdrawn position of said plate projects from the cylindrical surface of the bolt but also the other points of said plate, may project from the cylindrical surface. For instance, the points may project 0.2 mm.

The cited measures for preventing the anchor bolt from turning in the hole when screwing the nut may be applied in concrete, stone, metal, wood and other materials.

Figure 6:
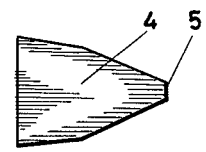
FIG. 6 is a top view of the cooperating member.
Figure 8:
FIG. 8 is a side view of an alternative embodiment of the invention.
Figure 9:
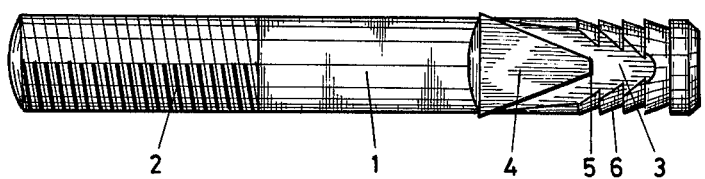
FIG. 9 is a plan view of an alternative embodiment.

FIG. 6 shows a preferred embodiment of the invention in which notches 6 are provided in the end opposite to the screw-thread 2 of the bolt shank 1 lying in planes perpendicular to the bolt axis. After inserting the anchor bolt in a hole bored for that purpose and screwing a nut on the screw-threaded end of said bolt for anchoring the bolt, the said notches of the bolt at that end engage the bore wall. By providing said notches the advantageous result is achieved that the force for pulling out the anchor bolts is considerably enlarged from 6 to about 7 tons.

The plate may be delivered apart or attached on the shank of the anchor bolt by means of adhesive or adhesive tape. When during manufacturing the plate is attached to the bevelled portion in its withdrawn position by means of adhesive tape, the insertion of the anchor bolt in the hole bored is facilitated. The coupling of plate and anchor bolt may also be achieved by magnetizing said plate.

In view of manufacturing the anchor bolt it may be observed that the bevelled portion may be provided in the shank of the anchor bolt in a relatively simple way, for instance by pressing, whereas the plate easily may be punched out. By means of those simple operations a substantially high production is possible, for example 10,000 anchor bolts a day.

While in known anchor bolts the wedge function results in that only the segments or the expandable sleeve respectively around the bolt is pressed against the wall of the hole, the flat bevelled portion together with the plate results in that the bolt is pressed against the wall of the hole along its maximal part of its cylindrical surface and consequently is fixed very tight.

What is claimed is:

1. An anchor bolt having a cylindrical shank, a screw-threaded portion formed on one end of said shank for receiving a nut, wherein the screw-threaded portion has a diameter equal to that of the shank, said shank having an essentially flat bevelled portion, the depth of said bevelled portion perpendicular to the bolt axis decreasing in the direction of the shank end opposite to the screw-threaded end, a shiftable member mounted on said bevelled portion and movable away from the bolt with respect to the bolt axis during relative displacement of said shiftable member and said bolt, wherein the improvement comprises said shiftable member mounted on the bevelled portion comprising a flat plate of uniform thickness, wherein said flat plate is polygonal in shape and at least one corner of said flat plate projects from the cylindrical circumference of said bolt shank, and wherein the cross-sectional area of said bolt at the position of the maximum depth of said bevelled portion is greater than the cross-sectional area of the core of the screw-thread.

2. The anchor bolt according to claim 1, further comprising circumferential notches at the end of the shank opposite the end having the screw-thread, said notches situated in planes perpendicular to the bolt axis.

3. The anchor bolt according to claim 1, wherein said flat plate and said bolt are magnetically coupled to each other.

4. The anchor bolt according to claim 1 wherein said flat bevelled portion is at an angle of 10° with respect to the axis of said bolt.

5. The anchor bolt according to claim 1 wherein said corner of said flat plate projects 0.2mm from the cylindrical surface of said bolt shank.

* * * * *